United States Patent
Cramer et al.

(10) Patent No.: US 7,145,349 B1
(45) Date of Patent: Dec. 5, 2006

(54) METHOD FOR INCREASING THE INTERFERENCE RESISTANCE OF A TIME FRAME REFLECTOMETER AND A CIRCUIT DEVICE OF IMPLEMENTING SAID METHOD

(75) Inventors: Stefan Cramer, Lampertheim (DE); Markus Hertel, Lampertheim (DE); Bernd Krieger, Mannheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 254 days.

(21) Appl. No.: 10/089,092

(22) PCT Filed: Oct. 15, 2000

(86) PCT No.: PCT/EP00/10137

§ 371 (c)(1),
(2), (4) Date: Aug. 7, 2002

(87) PCT Pub. No.: WO01/29521

PCT Pub. Date: Apr. 26, 2001

(30) Foreign Application Priority Data

Oct. 15, 1999 (DE) ................................ 199 49 992

(51) Int. Cl.
*G01R 27/04* (2006.01)
*G01R 31/11* (2006.01)
*G01S 13/08* (2006.01)

(52) U.S. Cl. ...................... 324/642; 324/639; 324/534; 342/127

(58) Field of Classification Search ........ 324/642–646, 324/527–535; 342/127–130; 73/290 V, 73/290 R
See application file for complete search history.

(56) References Cited

U.S. PATENT DOCUMENTS 5,563,605 A   10/1996   McEwan .................... 342/202

(Continued)

FOREIGN PATENT DOCUMENTS

DE           1815752         6/1970

(Continued)

*Primary Examiner*—Anjan Deb
*Assistant Examiner*—Jeff Natalini
(74) *Attorney, Agent, or Firm*—Bacon & Thomas

(57) ABSTRACT

The invention relates to methods and a circuit for increasing the interference resistance of a time frame reflectometer, in particular with respect to high frequency irradiation. A transmitted pulse (XS) is generated at a pulse repeater frequency (fprf) and coupled to a wave guide (4). A return signal (Xprobe) is returned to the wavwguide (4) by a reflector (14) which is connected to said waveguide (4) and is scanned for time-expanded representation as a reflection profile with scan pulses (XA) which are repeated at a scan frequency (fA) and measurement values are continuously calculated from said reflection profiles, expressing the distance from the reflector (14) to the process connection. The scanning frequency (fA) and the pulse repeater frequency (fprf) are altered and either the expanded time representation of the reflection profile remains unchanged or when a time change occurs in the reflection profile and said change in time expansion is and taken into account in evaluating the profile, whereby an interference factor is determined from at least one measurement of said reflection profile. In order to decide on the usability of the measurement values, an algorithm is used to calculate on the basis of the measured values said interference to the extent that sufficient measuring accuracy is attained. A circuit arrangement comprising a trigger generator (1) is used to implement the method.

16 Claims, 4 Drawing Sheets

U.S. PATENT DOCUMENTS

| | | | |
|---|---|---|---|
| 5,609,059 A | 3/1997 | McEwan | 73/290 R |
| 5,787,352 A * | 7/1998 | Benveniste | 455/452.2 |
| 5,793,480 A * | 8/1998 | Lacey et al. | 356/73 |
| 5,841,666 A * | 11/1998 | Perdue et al. | 702/189 |
| 5,973,636 A * | 10/1999 | Okubo et al. | 342/70 |
| 5,977,926 A * | 11/1999 | Gilger | 343/781 P |
| 6,559,657 B1 * | 5/2003 | McCarthy et al. | 324/642 |

FOREIGN PATENT DOCUMENTS

| | | |
|---|---|---|
| DE | 29815069 U1 | 2/1999 |
| EP | 0780665 A2 | 6/1997 |
| EP | 0780665 A3 | 11/1998 |
| EP | 0875772 A2 | 11/1998 |

* cited by examiner

METHOD FOR INCREASING THE INTERFERENCE RESISTANCE OF A TIME FRAME REFLECTOMETER AND A CIRCUIT DEVICE OF IMPLEMENTING SAID METHOD

FIELD OF THE INVENTION

The invention relates to a method for increasing the interference resistance of a time domain reflectometer, in particular to high-frequency radiation, in which at a pulse repetition frequency a transmission pulse is generated and coupled into a waveguide, whose upper end toward the process terminal is disposed on a holder part. The invention also relates to a circuit arrangement for performing the method.

PRIOR ART

For determining the fill level of media in a container, sensors based on time domain reflectometry (TDR) are known.

U.S. Pat. No. 5,609,059 provides an overview. Such sensors are based on the transit time measurement of electromagnetic signals that are propagated along an open waveguide that protrudes into the medium. The waveguide is for instance a Sommerfeld line, a Goubau line, a coaxial cable, a microstrip, or a coaxial or parallel arrangement of two lines. At the boundary face to the outer medium, or in the case of layering inside the medium, because of the abrupt change in its dielectric properties, the medium creates a discontinuity in the transmission properties of the waveguide dipped into it, so that pulses propagating along or inside the waveguide are at least partly reflected at these places. From the back-reflected signal ($X_{probe}$), the distance or height of a boundary layer can thus be determined, by comparing the instant of reception of the back-reflected pulse with the instant of the transmission.

In operation of a tdr sensor, a transmission pulse $X_S$ is generated and transmitted with each period of a transmission trigger signal $X_{TS}$, which has the pulse repetition frequency $f_{prf}$; a typical pulse repetition frequency is between a few hundred KHz and several MHz. The periodically back-reflected signal $X_{probe}$ is delivered to a signal scanning circuit, in order to make the chronologically brief event capable of being displayed and evaluated in time-expanded form. This circuit is triggered with the trigger signal $X_{TA}$ at the scanning frequency $f_A$, and the periodic signal $X_{probe}$ is scanned at the scanning trigger times. By a time-proportional delay of the scanning trigger signal compared to the transmission trigger signal, for instance by means of a somewhat lower frequency of the scanning trigger signal compared to the transmission trigger signal, or by a phase modulation of the scanning trigger signal compared to the transmission trigger signal, the scanning device generates an output signal, whose amplitude course is defined by the corresponding instantaneous values of the probe signal. After filtration and amplification, this output signal, or a chronological fragment of it, forms the reflection profile $X_{video}$, from which the transit time of the back-reflected signal and thus the distance of the boundary layer can be ascertained.

From German Patent Disclosure DE-A 18 15 752, a scanning or sampling circuit is known in which the pulse to be scanned is supplied to a blocked reception diode, which opens as a result of the scanning pulse. Scanning circuits based on four diodes, which are coupled to one another in a bridge circuit, are also known.

A tdr fill level sensor has been disclosed by German Utility Model DE 298 15 069 U1; it comprises a waveguide which dips into a product and to which a scanning circuit is connected that has a transmission pulse generator for generating a pulsed high-frequency wave signal, a receiver for receiving the high-frequency wave signal, a transmission/reception separator for separating the transmitted and received high-frequency wave signal, a scanner for scanning the received high-frequency wave signal, a scanning pulse generator for controlling the scanner, and a buffer store for temporary storage of the received high-frequency wave signal. The scanning circuit has two quartz oscillators, at least one of which is variable in frequency, and one of which controls the transmission generator and the other controls the scanning pulse generator. From the two frequencies, a frequency mixer forms the difference, which is for setting the time expansion factor to a set-point value. A disadvantage here is that quartz oscillators cannot be mistuned far enough. If conversely, oscillators that are tunable in a wider range, for instance using LC oscillator circuits are used, then because of the higher phase noise they have poor synchronism.

A problem in such sensors is also the high vulnerability to interference in the form of high-frequency interference signals. An interference signal which is coupled onto the waveguide is superimposed on the back-reflected signal $X_{probe}$ and is likewise detected by the broadband scanning circuit. A typical narrowband interference signal is simulated in tests of electromagnetic compatibility (EMV) by a carrier oscillation at a fundamental frequency $f_{T,stör}$ of 80 MHz to 1 GHz at a low-frequency amplitude modulation (such as 1 KHz). If the carrier frequency $f_{T,stör}$ is in the vicinity of an integral multiple of the scanning frequency $f_A$, or in other words is within a so-called "frequency reception slot" $n \cdot f_A \pm \Delta f$, then this interference cannot be suppressed by low-pass filtration downstream of the scanning device; $\Delta f$ is the bandwidth of the low-pass filter (reference numeral 7 in FIG. 1); n is an integer. The interference signal is scanned at the frequency $f_A$ on the order of bandpass scanning. Thus compared to the case without interference, an oscillation is superimposed on the reflection profile, making it harder to evaluate and possibly making the evaluation incorrect.

Because of the measurement principle with a broadband reception circuit and a probe that acts as a rod antenna, the coupling factor of interference is very high. The useful signal upon interference that is within a frequency reception slot is thus as a rule no longer evaluatable.

To improve the security against interference, the transmission pulse amplitude can be increased, which improves the signal-to-noise ratio. The pulse width and the rise and fall times of the transmission pulse must be constant then, so as not to impair the measurement accuracy. This can no longer be achieved with a simple transistor switching stage. An improvement is possible only by using other technologies, such as memory switching diodes or avalanche transistors. However, these have disadvantages, such as increased expense, availability of components, an increased power demand by the sensor, and increased vulnerability to interference.

A reduction in the interference level can also be attained by limiting the sensor used to metal tanks, which reduces the coupling factor. By using coaxial probes or two-conductor probes, the amplitude of the useful signal is higher compared to a single-conductor probe, such as a Sommerfeld or Goubau line, and the interference signal coupling is reduced.

However, the disadvantages of these probes are the increased adhesion of materials to the probes.

OBJECT OF THE INVENTION

The object of the invention is to provide a method for increasing the security against interference of time domain reflectometers, with which the operational accuracy of known time domain reflectometers, in particular with respect to high-frequency interference signals, can be improved simply and economically and that is meant to be usable universally.

SUMMARY OF THE INVENTION AND ITS ADVANTAGES

This object is attained by the method for increasing the interference resistance of a time domain reflectometer, in particular to high-frequency radiation, in which at a pulse repetition frequency $f_{prf}$ a transmission pulse $X_S$ is generated and coupled into a waveguide, whose upper end toward the process terminal is disposed on a holder part, and the signal $X_{probe}$, reflected back by a reflector, which is in contact with the waveguide, and returning on the waveguide is scanned for time-expanded display as a reflection profile with scanning pulses $X_A$, which are repeated at a scanning frequency $f_A$, and from the reflection profiles, measured values are continuously obtained that contain the distance of the reflector to the process terminal, having the following characteristics:

I) the scanning frequency $f_A$ and the pulse repetition frequency $f_{prf}$ are varied, and either II.1) the time-expanded display of the reflection profile remains unchanged, or II.2) if the reflection profile changes over time, the change in the time expansion is known and is taken into account in the evaluation of the profile, III) an amount of interference is determined from at least one measurement of the reflection profile or a part thereof; IV) for deciding about the usability of the measured values, or a single measured value, an algorithm is used which from the measured values, or a single measured value, and the amount of interference calculates whether the reflection profile is sufficiently free of interference that adequate measurement accuracy is achieved.

In a further feature of the method, the algorithm can comprise the following steps: V) if the amount of interference exceeds a predetermined threshold, the scanning frequency ($f_A$) and the pulse repetition frequency ($f_{prf}$) are varied; VI) the amount of interference is determined and assessed again; VII) steps V) and VI) are repeated until the amount of interference is below the predetermined threshold.

In a further feature of the method, the variation in the scanning frequency and the pulse repetition frequency is made on the basis of a predetermined table which contains suitable frequencies, the access to the table to being linear or random. Or, for changing the scanning frequency and the pulse repetition frequency, the frequencies are selected from a frequency range.

Advantageously, the pulse repetition frequency $f_{prf}$ can be varied by means of a voltage controlled or numerically controlled oscillator VCO or NCO.

In a further feature of the invention, the scanning trigger signal $X_{TA}$ can be obtained from the transmission trigger signal $X_{TS}$ by means of a controllable delay circuit, and the delay circuit can be supplied with a reference signal $X_S$ or $X_{TS}$ at the pulse repetition frequency $f_{prf}$, and the delay circuit generates an output signal $X_A$ and $X_{TA}$, and the delay in the output signal $X_A$, $X_{TA}$ is determined by a predeterminable set-point delay value, with which the delay circuit is controlled.

Thus according to the invention, in the event of a narrowband interference, the frequency reception slot defined by $n \cdot f_A \pm \Delta f$, where $n=0, 1, \ldots$, can be shifted along the frequency scale, by—optionally iterative—variation of the scanning frequency $f_A$, that the fixed interference frequency $f_{T,stör}$ is outside the slot ranges. The amount of interference is reduced as a result, because then the interference signal no longer contributes, or no longer contributes substantially, to the measured reflection profile.

In the circuit arrangement, the scanner unit is equipped with a large-signal four-diode circuit.

The amount of interference can also be obtained and defined by a comparison of the pulse, created by the reflection at the boundary layer, with a predetermined reference pulse. To that end, the amplitude of the measurement pulse can be standardized, and a measure of deviation can be determined; a maximum allowable deviation is specified, for instance by comparison of the pulse widths or comparison of the different areas.

In a further feature of the method, the amount of interference can be obtained by means of the difference between the maximum and minimum deviation in the reflection profile from a predetermined value, or from the reference profile, in a predetermined time slot or spacing slot.

In a further feature of the invention, the frequency and/or phase of the scanning pulses ($X_A$) upon a change in the pulse repetition frequency ($f_{prf}$) is adapted such that the difference between the scanning frequency and the pulse repetition frequency does not exceed a predetermined range or is constant.

The object of the invention is also attained by a method for increasing the interference resistance of a time domain reflectometer, in particular to high-frequency radiation, in which at a pulse repetition frequency a transmission pulse is generated and coupled into a waveguide, whose upper end toward the process terminal is disposed on a holder part, and the signal, reflected back by a reflector, which is in contact with the waveguide, and returning on the waveguide is scanned for time-expanded display as a reflection profile with scanning pulses, which are repeated at a scanning frequency, and from the reflection profiles, measured values are continuously obtained that contain the distance of the reflector to the process terminal, having the following algorithm for deciding on the usability of the measured values;

I) varying the scanning frequency ($f_A$) and the pulse repetition frequency ($f_{prf}$), and either II.1) the time-expanded display of the reflection profile remains unchanged, or II.2) if there is a change over time in the reflection profile, the change in the time expansion is known and is taken into account in the evaluation of the profile;

III) determining the amount of interference and obtaining the measured value from the measurement of the reflection profile or of a part thereof;

IV) checking the usability of the measured value by evaluating the amount of interference, and continuing with step I.

In a further feature of the invention, the algorithm can then have the following further steps:

V) steps I–IV are executed multiple times, for example five times;

VI) selecting the most likely measured value from the measured values determined in step V), and using that value.

A circuit arrangement for performing the method has a trigger generator, which generates a transmission trigger signal $X_{TS}$ with a variable pulse repetition frequency $f_{prf}$ that is variable by a control signal, and a scanning trigger signal $X_{TA}$ with a frequency and/or phase different from the transmission trigger signal $X_{TS}$, and the transmitting and scanning trigger signal cause a transmitting or scanning generator to generate transmitting and scanning pulses, respectively, and having a scanning unit, which is capable of scanning the transmission pulses $X_{probe}$ returned from the waveguide for time-expanded display as a reflection profile $X_{video}$, and having a control unit, which is capable of evaluating the reflection profile and generates control signals which adjust the phase or frequency difference between the trigger signals, and with which the trigger generator is made to vary the pulse repetition frequency $f_{prf}$.

The trigger generator can include a controlled oscillator, which for example is voltage controlled or numerically controlled VCO or NCO, and whose output signal represents the scanning trigger signal $X_{TA}$ for adjusting the delay of the scanning trigger signal $X_{TA}$ relative to the transmission trigger signal $X_{TS}$.

To that end, two controlled oscillators, which for instance can be voltage or numerically controlled, can be present for the transmission trigger signal $X_{TS}$ and for the scanning trigger signal $X_{TA}$. The frequency difference $\Delta f$ between the trigger signals is adjusted by a regulator to a predetermined value and kept constant. The oscillators can also be embodied as an oscillator bank for making a constant frequency difference between the pulse repetition frequency $f_{prf}$ and the scanning frequency $f_A$ available.

If the interference signal comprises a superposition of a plurality of narrow-band signals, then with the method of the invention, by means of the iteration, a pulse repetition frequency can be found that minimizes the total influence of all the interference frequencies.

The amount of interference is obtained from the deviations of the measured reflection profile from a reference profile determined beforehand under interference-free conditions. As the amount of interference, the difference between the maximum and minimum deviation of the reflection profile from a predetermined value or from the reference profile in a defined time or distance slot, such as the starting of ascertaining the profile until the onset of the transmission pulse, namely the domain A in FIG. 3, can be used. The threshold at which, when it is exceeded, the scanning frequency is varied is obtained from the deviations from the reference profile that are still tolerable for assuring a given measurement accuracy.

If the scanning frequency has now been varied according to the invention, then from the newly determined amount of interference it is ascertained whether the variation in the scanning frequency was done in the correct direction, that is, has led to a reduction in the amount of interference compared to the first measurement. If so, the adaptation of the scanning frequency can be continued with the same trend, that is, a further increase or a further decrease, as long as the interference threshold has not already been undershot. If no improvement in the amount of interference has ensued, the adaptation of the scanning frequency can be done, beginning at the original scanning frequency, in the other direction from the first adaptation attempt. However, continuing in the same direction also leads to success, because of the infinite slot width. The assessment and adaptation of the scanning frequency can be done by a regulating circuit, for instance.

DESCRIPTION OF THE PREFERRED EMBODIMENTS

Figure 1:
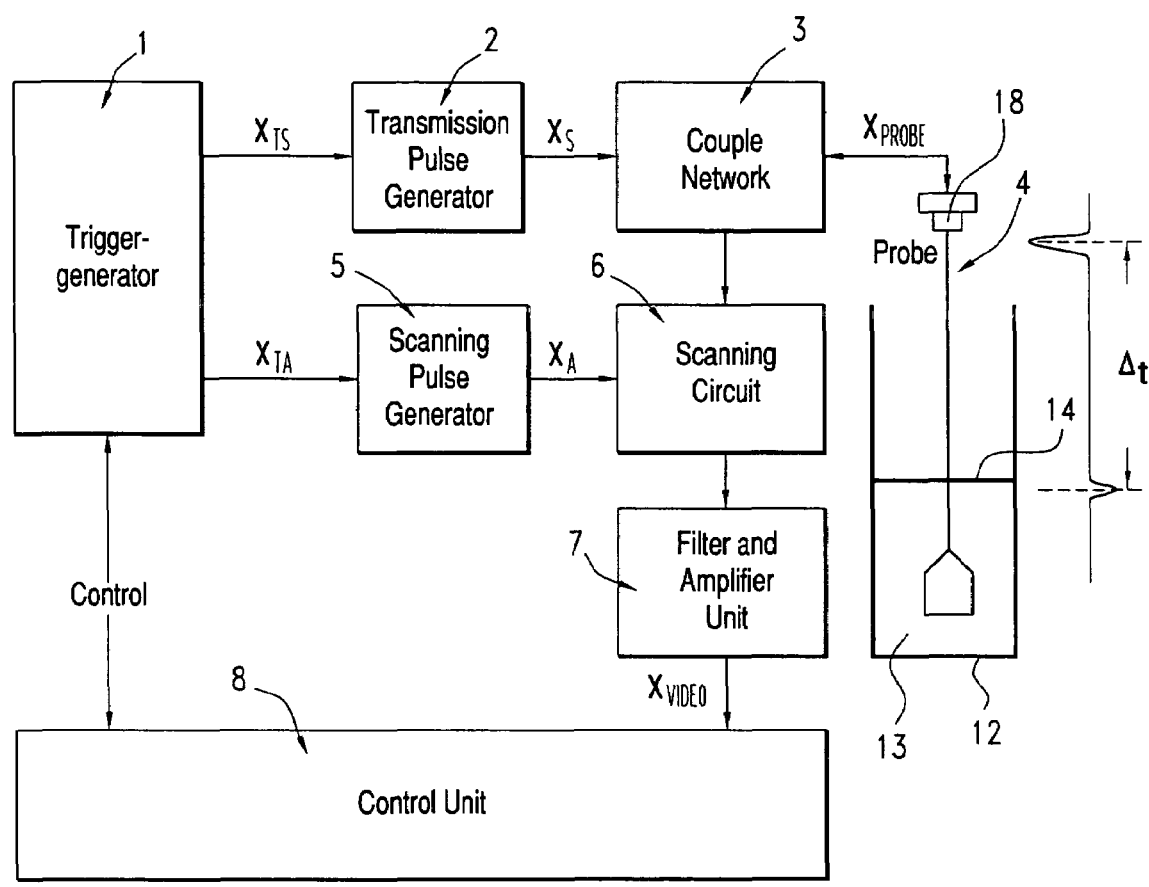
FIG. 1 is a block circuit diagram of a tdr fill level sensor with improved security against interference.
Figure 4:
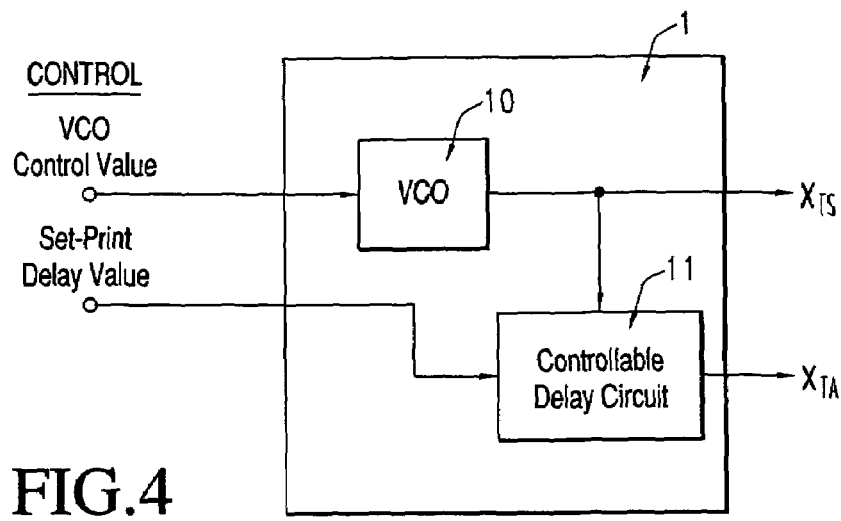
FIG. 4 shows an arrangement for varying the pulse repetition frequency and for generating a scanning trigger signal.
Figure 5:
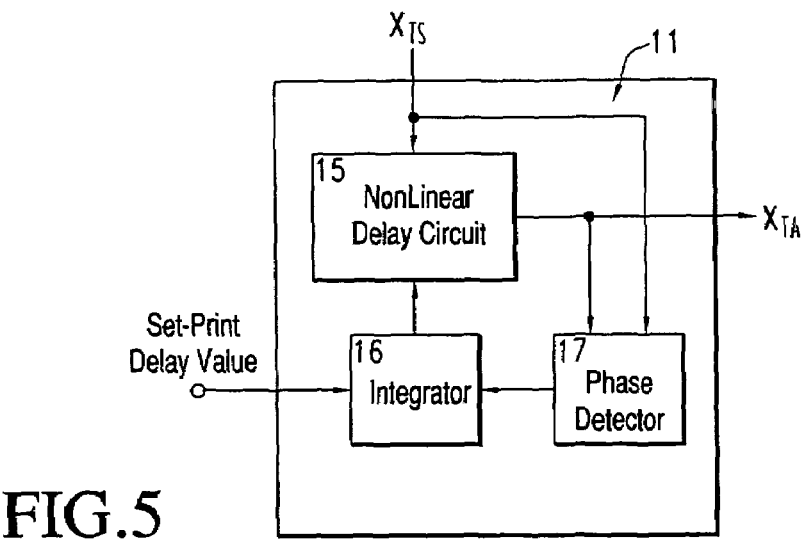
FIGS. 5 and 6 show two arrangements for realizing a controlled delay circuit for generating a scanning trigger signal.
Figure 6:
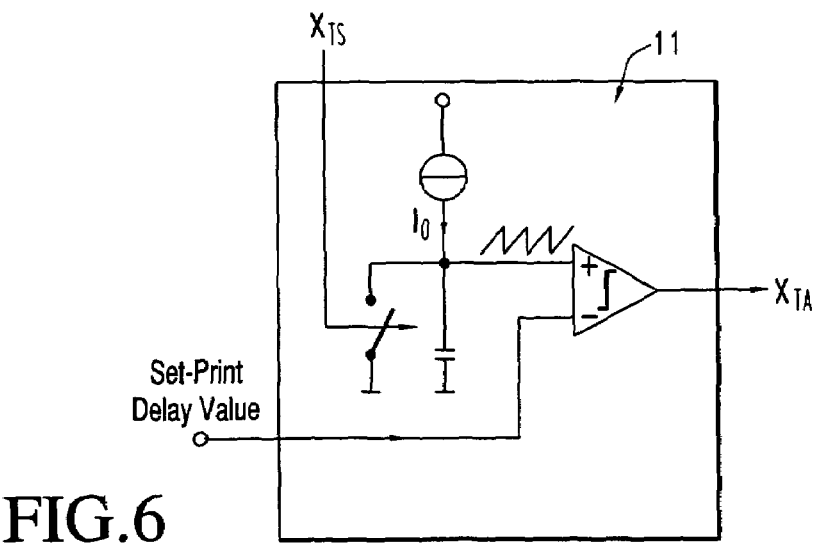

In FIG. 1, the basic layout of a tdr fill level sensor with improved security against interference is shown schematically, as an example of an application of the invention. The key part of the sensor is a waveguide 4, whose upper end forms the process terminal 18 and for instance is a retaining part 18; the waveguide 4 protrudes into a container 12 and dips partway into a medium 13 contained therein which forms a surface 14 and hence a boundary layer 14. A trigger generator 1 is used to generate a transmission trigger signal $X_{TS}$ at the pulse repetition frequency $f_{prf}$ and a scanning trigger signal $X_{TA}$ at the scanning frequency $f_A$. The trigger generator 1 is controlled by a control unit 8. Examples of the detailed embodiment of the trigger generator 1 are shown in FIGS. 4–6 and explained in conjunction with them.

The transmission trigger signal $X_{TS}$ is supplied to a transmission pulse generator 2, which as a result is made to generate transmission pulses $X_S$ of a predetermined signal shape and amplitude, at the pulse repetition frequency $f_{prf}$. The transmission pulses $X_S$ are coupled into the waveguide 4 via a couple network 3. They propagate along the waveguide 4 and are partly reflected at the level of the boundary layer 14 between the medium and the air. The back-reflected signal $X_{probe}$ is delivered via the couple network 3 to a scanning circuit 6. The scanned signal thus includes contributions of the originally transmitted pulse $X_S$ and the reflected pulse $X_{probe}$, or parts of a reference reflection, if a reference reflection is employed, which is equally possible. The scanned signal is schematically plotted in the right-hand part of FIG. 1, along the probe 14 between the boundary layer 14 and the retaining part 18. From the transit time difference $\Delta t$ between the two pulses, a conclusion about the level of the boundary layer 14 relative to the process terminal 18 can be drawn.

To make the short probe signal $X_{probe}$, which is repeated at the pulse repetition frequency $f_{prf}$, evaluatable, it is supplied in the context of a bandpass scanning to a scanning circuit 6, in which it is scanned with scanning pulses $X_A$, which are generated at a frequency $f_A$ by a scanning pulse generator 5. The scanning circuit 6 is selected such that it does not change its scanning behavior even at high interference signal levels, and is thus secure against large signals. A four-diode scanning circuit can preferably be used.

The scanning pulse generator 5, like the transmission pulse generator 2, is triggered by the trigger generator 1 by means of the scanning trigger signal $X_{TA}$ at the scanning frequency $f_A$. The scanned signal is filtered and amplified in a filter and amplifier unit 7, which has a low-pass filter for filtration, and then, in the form of the signal $X_{video}$ or as a reflection profile, is delivered to the control unit 8 for further evaluation.

In the control unit 8, an amount of interference is ascertained by comparison with a reference profile stored in memory. If a predetermined interference threshold is exceeded, then a signal for adapting the pulse repetition frequency is transmitted to the trigger generator 1. The method is then performed as described above.

Figure 2:
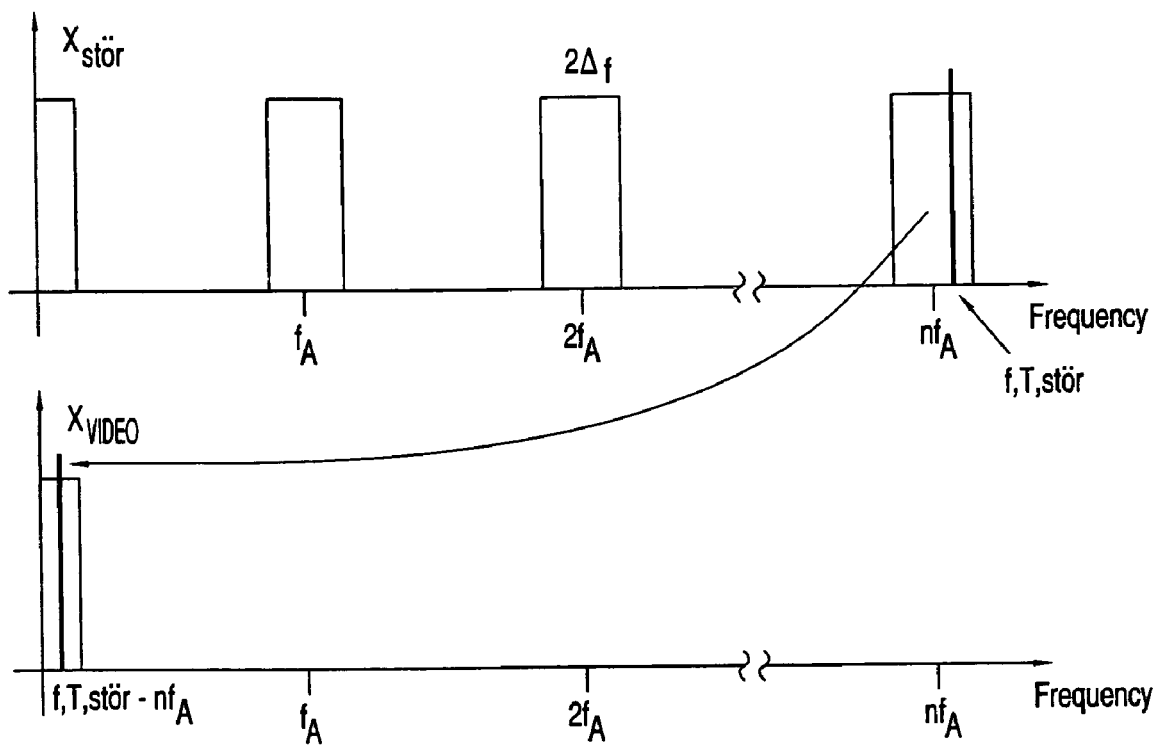
FIG. 2 shows the frequency conversion of an interference signal as a result of the scanning.

FIG. 2 schematically shows the frequency conversion as the result of the bandpass scanning of an interference signal $X_{stör}$ is shown; in the lower part, the low-frequency output signal $X_{video}$ created by scanning from $X_{stör}$ is plotted over the frequency. Integral multiples of the scanning frequency $f_A$ are marked on the frequency axis in both parts of FIG. 2.

Figure 3:
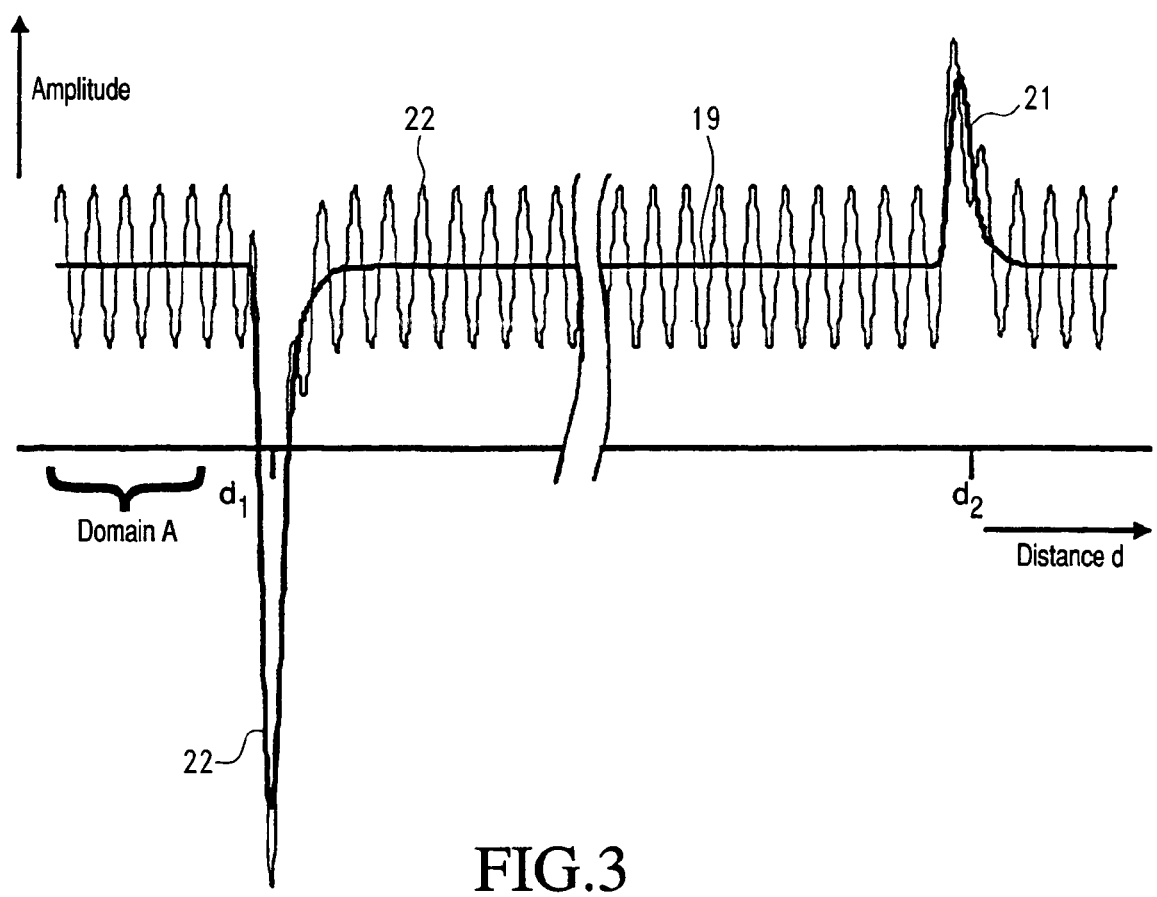
FIG. 3 shows a reference profile and a reflection profile with a superimposed interference signal.

FIG. 3 shows the basic course of the amplitudes of a reflection profile and of the reflection profile with a superimposed interference signal, as a function of the distance d from the process terminal 18 to the boundary layer 14. The reflection profile 19 without interference, which is shown in heavy lines in FIG. 3, first comprises a pulse 20 at position d1, where the pulse 20 can be either a transmitted pulse or a part of the transmission pulse itself or a reference reflection of the transmission pulse, for instance at the transition from the process terminal of the retaining part 18 to the probe 4. Second, the reflection profile 19 without interference comprises a pulse 21 at the position d2, which occurs as a result of the reflection at the boundary layer 14. From the difference d2–d1, the spacing of the location of reflection, that is, the location of the boundary layer 14, from the process terminal 18 can therefore be ascertained.

The signal 22 with interference, which is shown in fine lines in FIG. 3, is created from the superposition of the profile without interference and a narrow-band interference signal, which is shown here schematically as a sine wave without modulation. The illustration shows that the interference signal amplitude can easily be on the order of magnitude of the amplitude of the reflected pulse, or higher. It is evident that then the determination of the location of reflection of the transmission pulse will be adulterated or even become impossible.

According to the invention, the interference signal amplitude in the output signal $X_{video}$ is therefore reduced by varying the pulse repetition frequency. Because of the variation of the pulse repetition frequency, the interference no longer falls within a frequency reception slot, and it can suppressed with a low-pass filter of the filter and amplifier unit 7 in FIG. 1.

FIG. 4 shows a trigger generator 1 for generating a transmission trigger signal $X_{TS}$ at a variable pulse repetition frequency and for generating a scanning trigger signal $X_{TA}$ adapted to it. A signal $X_{TS}$ at the pulse repetition frequency $f_{prf}$ is generated by a controlled oscillator CO 10, which may be a voltage or numerically controlled oscillator. If the CO is a VCO, then it varies its frequency as a function of the tuning voltage, or VCO control variable, which is applied as an input signal to the VCO and is determined and controlled by the control unit 8 in FIG. 1. The instant of scanning can thus be adjusted by means of a set-point delay value, for instance by means of a ramp circuit, or arbitrarily. This means that the delay of the edge of the trigger generator can be varied linearly over time, namely by means of the ramp method, or the delay can be selected arbitrarily and randomly.

The signal generated by the VCO is used on the one hand to trigger the transmission pulse $X_{TS}$. It is also delivered to a controllable delay circuit 11. This circuit generates an output signal $X_{TA}$, which has a defined delay compared to the signal $X_{TS}$. The output signal $X_{TA}$ of the delay circuit 11 thus has a defined delay, or defined, slight frequency difference, compared to the signal $X_{TS}$ of the VCO. The magnitude of the delay is regulated by a set-point delay value, which is determined by the control unit 8 and is applied as an input signal to the delay circuit 11.

In FIGS. 5 and 6, examples for realizing a controllable delay circuit 11 of FIG. 4 are shown.

In the arrangement of FIG. 5, the signal $X_S$ or $X_{TS}$ generated at the pulse repetition frequency by the oscillator is delivered to a nonlinear delay circuit 15, where it is delayed variably relative to the reference signal $X_S$ or $X_{TS}$. The delay circuit 15 can comprise an RC network. The delay is adjusted by voltage control, in this case via the output signal of an integrator 16, which in turn is determined by the externally predetermined set-point delay value and by the output signal of a phase detector 17. The phase detector 17 determines the phase relationship of the reference signal to the delayed signal and generates an output signal whose amplitude is defined by the phase relationship. By the interconnection of the phase detector 17, integrator 16 and delay circuit 15, a regulating circuit is formed in which an equilibrium is established. A phase delay of the delayed signal $X_A$ or $X_{TA}$ relative to the reference signal $X_S$ or $X_{TS}$ is generated, which depends linearly on the set-point delay value.

The set-point delay value can also be input in the form of a digital code, which is converted by a digital/analog converter into an analog control signal. The delay of the scanning trigger signal can therefore be adjusted in a simple way. Upon variation in the pulse repetition frequency, the scanning signal is thus adapted automatically, simply and directly, in accordance with the predetermined set-point delay value set once and for all, without requiring manual correction. One possibility for realizing a circuit in accordance with FIG. 5 is described in U.S. Pat. No. 5,563,605.

FIG. 6 shows a further possibility for realizing a delay circuit 11. The reference signal $X_S$ or $X_{TS}$ causes a sawtooth generator, shown schematically here in the form of a current source and a capacitor, to generator a sawtooth voltage at the pulse repetition frequency $f_{prf}$. This voltage is fed to one input of a comparator. The other input of the comparator is subjected to a voltage that is proportional to the set-point delay value. Thus the output signal of the comparator has a delay or phase displacement compared to the reference signal $X_{TS}$ or $X_S$, and the delay is determined by the set-point delay value. Thus an output signal $X_A$ or $X_{TA}$ can be produced in a simple way that is automatically adapted to changes in the pulse repetition frequency $f_{prf}$. One of various possibilities for realizing such a circuit of FIG. 6 is described in German Patent DE 27 23 355 C2.

As an alternative to the controllable delay circuit, the frequencies $f_{prf}$ and $f_A$ can also be generated by two controllable oscillators CO with regulation. To that end, a high-speed regulator is required inside the control unit of FIG. 1, for the differential frequency Δf. An oscillator bank can also be used, with quartz oscillators for from two to three different frequencies for the frequencies $f_{prf}$ and $f_A$. Of each two oscillators, one is fixed and the other is controllable.

Commercial Utility:

The invention can be advantageously used commercially for sensors for fill level measurement on the basis of time domain reflectometry, for increasing the electromagnetic compatibility with high-frequency interference fields and for simply and economically meeting EMV specifications simply and economically. The utility of the invention is that by varying the scanning frequency and/or the pulse repetition frequency, contributions of a narrow-band interference to the measured signal can advantageously be suppressed.

The invention claimed is:

1. A method for increasing the interference resistance of a time domain reflectometer, comprising the steps of:
   generating a transmission pulse at a pulse repetition frequency;
   coupling said transmission pulse into a waveguide;
   scanning a reflected signal which is reflected back by a reflector in contact with the waveguide, for time-expanded display as a reflection profile with scanning pulses repeated at a scanning frequency;
   continuously obtaining measured values, from said reflection profiles, that contain the distance of the reflector to a process terminal; and
   using an algorithm for deciding the usability of said measured values, which from said measured values and the amount of interference calculates whether said reflection profile is sufficiently free of interference that adequate measurement accuracy is achieved, wherein:
   said scanning frequency and said pulse repetition frequency are varied;
   the time-expanded display of said reflection profiles remains unchanged, or if said reflection profiles change over time, the change in the time expansion is known and is taken into account in the evaluation of the profiles; and
   the amount of interference is determined from at least one measurement of said reflected profiles or a part thereof.

2. The method as defined in claim 1, wherein the algorithm comprises the following steps:
   varying said scanning frequency and said pulse repetition frequency, if the amount of interference exceeds a predetermined threshold;
   subsequent to said step of varying said scanning-frequency and said pulse repetition frequency, determining and assessing again the amount of interference; and
   repeating said step of varying said scanning-frequency and said pulse repetition frequency and said subsequent determining and assessing step until the amount of interference is below said predetermined threshold.

3. The method as defined in claim 2, further comprising the step of:
   providing a predetermined table which contains suitable frequencies used for determining the variation in said scanning frequency and said pulse repetition frequency, wherein access to said predetermined table is one of: linear and random.

4. The method as defined in claim 3, further comprising the step of:
   selecting said scanning frequency and said pulse repetition frequency from a frequency range for the purpose of changing said scanning frequency and said pulse repetition frequency.

5. The method as defined in claim 1, wherein said pulse repetition frequency is varied by means of one of: a voltage controlled oscillator and a numerically controlled oscillator.

6. The method as defined in claim 5, further comprising the steps of:
   providing a controllable delay circuit supplied with a reference signal at said pulse repetition frequency, and generating an output signal;
   determining the delay in said output signal by a predetermined set-point delay value, with which the controllable delay circuit is controlled; and
   obtaining a scanning trigger signal from a transmission trigger signal by means of the controllable delay circuit.

7. The method as defined in claim 1, wherein the amount of interference is obtained by a comparison of the pulse associated with said reflected profiles with a predetermined reference pulse.

8. The method as defined in claim 1, wherein the amount of interference is obtained by one of: a difference between a maximum and minimum deviation in said reflection profiles from a predetermined value, and a difference between a maximum and minimum deviation from a reference profile in a predetermined time slot or spacing slot.

9. The method as defined in claim 1, wherein the frequency and/or phase of said scanning pulses, upon a variation in said pulse repetition frequency, is adapted such that a difference between said scanning frequency and said pulse repetition frequency does not exceed a predetermined range or is constant.

10. A method for increasing the interference resistance of a time domain reflectometer, comprising the steps of:
    generating a transmission pulse at a pulse repetition frequency;
    coupling said transmission pulse into a waveguide;
    scanning a reflected signal which is reflected back by a reflector in contact with the waveguide, for time-expanded display as a reflection profile with scanning pulses repeated at a scanning frequency;
    continuously obtaining measured values, from said reflection profiles, that contain the distance of the reflector to a process terminal; and
    using an algorithm for deciding the usability of said measured values, said algorithm comprising:
    varying said scanning frequency and said pulse repetition frequency;
    applying the time-expanded display of said reflection profiles which remains unchanged, or if said reflection profiles change over time, applying the change in the known time expansion where the change is taken into account in the evaluation of the profiles;
    determining the amount of interference and obtaining the measured value from the measurement of said reflected profiles or a part thereof; and
    checking the usability of the measured value by evaluating the amount of interference, and continuing with the step of varying said scanning frequency and said pulse repetition frequency.

11. The method as defined in claim 10, wherein the algorithm comprises the following further steps:
    executing the steps of claim 10 multiple times; and
    selecting the most likely measured value from the measured values determined in said step of executing the steps of claim 10 multiple times and using that value.

12. A circuit arrangement for increasing the interference resistance of a time domain reflectometer, comprising:
    a trigger generator for generating a transmission trigger signal with a variable pulse repetition frequency that is variable by a control signal, and a scanning trigger signal with a frequency and/or phase difference from said transmission trigger signal;
    a scanning generator for generating transmitting and scanning pulses, respectively caused by said transmitting and said scanning trigger signal;
    a scanning unit capable of scanning said transmission pulses which are returned from a waveguide for time-expanding display as a reflection profile; and a control unit for evaluating said reflection profile and generating said control signal which adjusts the phase or frequency difference between said trigger signals, and with which said trigger generator is made to vary said variable pulse repetition frequency, said control unit including an algorithm capability for calculating interference of the reflected profile for determining measurement accuracy.

13. The circuit arrangement as defined in claim 12, wherein said trigger generator includes a controlled oscillator which is controlled by one of: voltage and numerical, and which oscillates at said variable pulse repetition frequency.

14. The circuit arrangement as defined in claim 13, wherein said trigger generator includes a controllable delay circuit which is subjected to the output signal of said controlled oscillator, and whose output signal represents said scanning trigger signal.

15. The circuit arrangement as defined in claim 13, further comprising:
a regulator, and wherein said trigger generator further includes a further controlled oscillator which oscillates at a scanning frequency, and optionally the difference in frequencies of the oscillations of both controlled oscillators is set to a predetermined value by said regulator and kept constant.

16. The circuit arrangement as defined in claim 15, wherein said oscillators are embodied as an oscillator bank in order to furnish a constant frequency difference between said variable pulse repetition frequency and the scanning frequency.

* * * * *